(No Model.)

T. I. WITTING.
MEASURING FAUCET.

No. 418,601. Patented Dec. 31, 1889.

WITNESSES:
F. G. Fischer
A. A. Higdon

INVENTOR:
T. I. Witting
BY Higdon & Higdon
his ATTORNEYS.

UNITED STATES PATENT OFFICE.

THEODORE I. WITTING, OF LAWRENCE, KANSAS.

MEASURING-FAUCET.

SPECIFICATION forming part of Letters Patent No. 418,601, dated December 31, 1889.

Application filed August 10, 1889. Serial No. 320,410. (No model.)

*To all whom it may concern:*

Be it known that I, THEODORE I. WITTING, of Lawrence, Douglas county, Kansas, have invented certain new and useful Improvements in Combined Sirup-Jar and Measuring-Faucet for Beverage-Dispensing Apparatus, of which the following is a full, clear, and exact description, reference being had to the accompanying drawings, forming a part hereof.

My invention relates to a combined sirup-jar and measuring-faucet for beverage-dispensing apparatus; and it consists in a novel construction and arrangement of parts, as fully set forth hereinafter, and specifically pointed out in the claims hereto appended.

Figure 1:
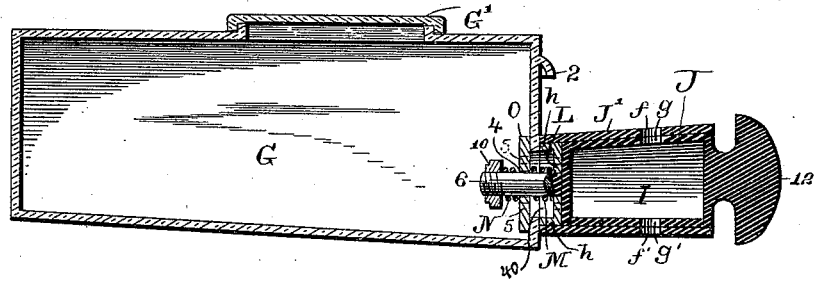
Figure 2:
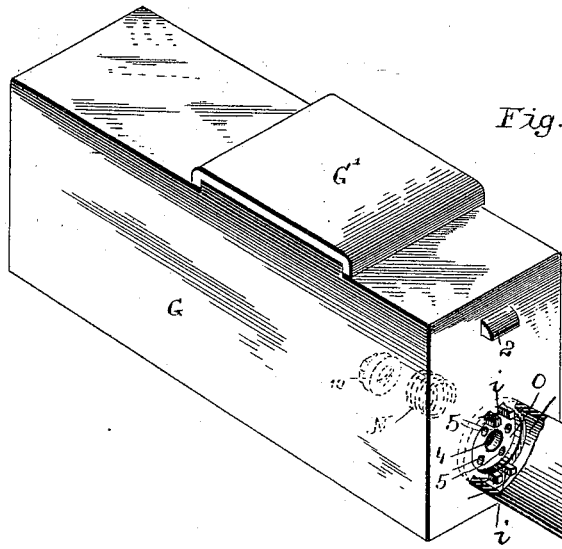
Figure 3:
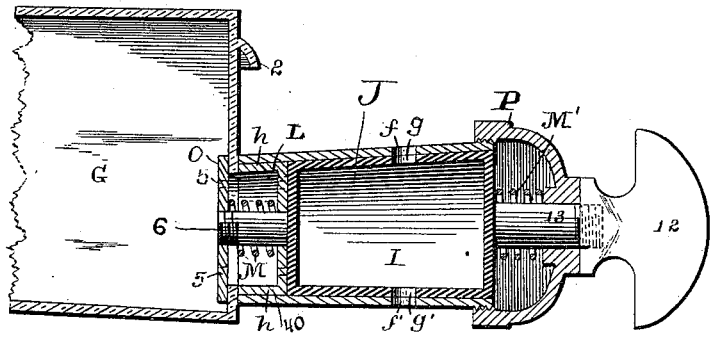

In the drawings, Figure 1 is a central sectional view of a device embodying my invention. Fig. 2 is a perspective view of the same with the plug, plate, and springs detached; and Fig. 3 is an enlarged sectional view of a slightly-modified form of faucet.

The sirup-can is preferably made of glass, with a suitable opening in its upper side closed by a removable cover G', provided with a suitable handle 2 on its front end, by means of which it can be pulled out of the can-chamber, and having casing J' of faucet J cast upon the same end that handle 2 is located upon; or the can may be made of tin or any suitable material and the entire faucet of brass, or its exposed surface lined with tin; or, further, the portion of said faucet could be made of hard rubber, as may be preferred. The inner end of casing J' is covered by a plate O, which forms the inner end of the same, and which plate is provided with a central opening 4, through which passes a threaded pin 6 of the plug I, and with several smaller openings 5, through which egress to the faucet is made.

L is a circular plate corresponding in diameter to the inner end of the plug, provided with apertures 7, located on either side of the central pin-opening 8, also formed therein, and provided with oppositely-located lugs H, which latter project at right angles from the inner face of said plate, which lugs engage corresponding holes or recesses *i*, formed at the inner end of the casing J, upon the interior thereof, for the purpose of holding said plate from turning the said plug, yet at the same time permitting the plug to work loosely in its casing and be adjusted farther in or out to make a tight joint, which is the object of this construction. A small chamber 40 is thus formed between the plate L and the plate O, into which the sirup flows before passing into the main measuring-chamber of plug I, said sirup flowing through apertures in said plate L and apertures 9 in inner end of the plug, which two series of apertures register when the plug is to be filled.

Casing J' is provided with upper and lower oppositely-located vents and discharge-holes $ff'$, respectively, while plug I, which is located within said casing, is provided with corresponding upper and lower vent and discharge holes $g$ and $g'$, respectively, which latter register with the holes $ff'$, formed in the casing J'.

The operation of this construction is as follows: When sirup is to be drawn, plug I is turned by means of handle 12 until apertures 9 in its end register with apertures 7 in plate L, and allowed to remain in such position until the plug is filled, when it is turned one-quarter of a revolution until discharge-apertures $g'$ and $f'$ register, discharging the contained measure of sirup into the glasses which are held beneath the faucet. The different parts of the faucet J, which engage each other, are held in proper adjustment by means of suitable springs, so that all leakage from loose adjustment will be entirely prevented.

M indicates the coiled spring, which is located on pin 6 of the plug, between plates L and N, the function of which is to urge plate L against the inner end of the plug I, thereby forming at all times a perfect joint therewith, while O is a coil or other suitable form of spring located between plate O and nut 10, which latter is threaded upon the inner end of said pin. By properly adjusting nut 10 the two springs will be compressed sufficiently to hold the parts in relative adjustment, and all leaks will be avoided.

The jar and the outer shell of the faucet may be made of glass cast in a single piece to obviate the necessity of connecting joints with the plug, plate, and springs of hard rubber or any other suitable material; or the entire jar and casing may be made of metal, with a cap P and spring M' fitted on the front end, in place of nut 10 and spring N on the rear end, as clearly shown in Fig. 3. Said cap is threaded on the outer end of the casing, and a pin 13, formed integral with the outer end of the plug, extends through a central aperture in the cap and has the handle 12 screwed on its projecting end. The spring M' is located in the casing and bears at its ends against the cap and the outer end of the plug, respectively. The pin 6 in this form of the faucet is threaded in the plate O instead of being engaged by a nut 10. The front end of the jar is preferably provided with a handle 2, to enable it to be withdrawn from the closure (not shown) in which said jars are retained.

The faucet above described may be used as a continuously-flowing faucet by removing or discarding the plate L and spring M.

An essential feature of my improved faucet is the fact that the registering ingress-apertures are formed in the end of the plug I. By reason of this construction it is evident that the inner end of said plug may be continued or lengthened for the purpose of direct contact with the plate O, in which case the plate L and spring M would not be needed and would be discarded, as above described.

Having thus described my invention, I claim—

1. A measuring-faucet having its outer casing formed integrally with a jar, a revoluble plug therein, a stationary plate having openings 7 and lugs to engage recesses at the inner end of the casing, and a pin extending through said plate, substantially as described.

2. The combination, with the casing having upper and lower openings, of the stationary plate provided with apertures 7, and having lugs to engage recesses at the inner end of the casing, the measuring-plug fitting in a casing provided with suitable ingress and egress openings, and having a pin 6 extending through a central opening in said stationary plate and engaged by a nut, and the spring bearing against said nut and adapted to have its tension adjusted thereby, substantially as specified.

3. The combination, with the casing having a stationary perforated plate near its inner end, of the measuring-plug having its perforated inner end bearing against said plate and provided with a pin extending through a central opening in the same and engaged by a nut, the perforated plate O, parallel with said stationary plate, the spring located between said plates, and the spring located on the pin between the plate O and the nut, substantially as specified.

In testimony whereof I affix my signature in presence of two witnesses.

THEODORE I. WITTING.

Witnesses:
WILLIAM WIEDERMANN,
H. L. RAYMOND.